(12) United States Patent
Herle et al.

(10) Patent No.: US 10,756,321 B2
(45) Date of Patent: Aug. 25, 2020

(54) CERAMIC COATING ON BATTERY SEPARATORS

(71) Applicant: APPLIED MATERIALS, INC., Santa Clara, CA (US)

(72) Inventors: Subramanya P. Herle, Mountain View, CA (US); Joseph G. Gordon, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 16/245,750

(22) Filed: Jan. 11, 2019

(65) Prior Publication Data
US 2019/0165348 A1    May 30, 2019

Related U.S. Application Data

(62) Division of application No. 14/652,018, filed as application No. PCT/US2013/074449 on Dec. 11, 2013, now Pat. No. 10,193,116.
(Continued)

(51) Int. Cl.
*H01M 2/14* (2006.01)
*H01M 2/16* (2006.01)
(Continued)

(52) U.S. Cl.
CPC ............ *H01M 2/145* (2013.01); *H01M 2/16* (2013.01); *H01M 2/162* (2013.01);
(Continued)

(58) Field of Classification Search
CPC .... H01M 2/1673; H01M 2/1686; H01M 2/16; H01M 2/1653; H01M 10/0525; H01M 2/145; H01M 2/162; H01M 2/1646
(Continued)

(56) References Cited

U.S. PATENT DOCUMENTS

| 2004/0406037 | 6/2004 | Cho et al. |
| 2006/0078791 A1 | 4/2006 | Hennige et al. |

(Continued)

FOREIGN PATENT DOCUMENTS

| CA | 2560837 A | 3/2007 |
| JP | 63028861 A | 2/1988 |

(Continued)

OTHER PUBLICATIONS

Patent Cooperation Treaty, International Search Report for PCT/US2013/074449, dated Mar. 25, 2014, pp. 1-4.
(Continued)

*Primary Examiner* — Miriam Stagg
*Assistant Examiner* — Abibatu O Ojo-Amoo
(74) *Attorney, Agent, or Firm* — Pillsbury Winthrop Shaw Pittman LLP

(57) ABSTRACT

The present invention relates generally to electrochemical energy storage devices such as Li-ion batteries, and more particularly to a method of providing uniform ceramic coatings with controlled thicknesses for separators in such storage devices. Some embodiments of the invention utilize a layer by layer coating of nano/micro-sized particles dispersed in a solvent, which can be aqueous or non-aqueous. Other embodiments of the invention utilize a dry process such as PVD for depositing a ceramic film on a porous polyolefin separator. According to certain aspects of the invention, advantages of this approach include the ability to achieve a denser more uniform film with better controlled thickness with less waste and higher yield than current ceramic coating technology. An advantage of a ceramic coated separator is increased safety of cells.

1 Claim, 4 Drawing Sheets

Related U.S. Application Data

(60) Provisional application No. 61/736,968, filed on Dec. 13, 2012.

(51) Int. Cl.
*H01M 10/0525* (2010.01)
*H01M 10/052* (2010.01)

(52) U.S. Cl.
CPC ....... *H01M 2/1646* (2013.01); *H01M 2/1653* (2013.01); *H01M 2/1673* (2013.01); *H01M 2/1686* (2013.01); *H01M 10/0525* (2013.01); *H01M 10/052* (2013.01)

(58) Field of Classification Search
USPC .................................. 429/246, 144
See application file for complete search history.

(56) References Cited

U.S. PATENT DOCUMENTS

| | | |
|---|---|---|
| 2006/0166085 A1 | 7/2006 | Hennige et al. |
| 2009/0208826 A1 | 8/2009 | Lee et al. |
| 2010/0024614 A1 | 2/2010 | Rex et al. |
| 2011/0027658 A1 | 2/2011 | Kim et al. |
| 2011/0053000 A1 | 3/2011 | Kanamura et al. |
| 2011/0183203 A1 | 7/2011 | Du et al. |
| 2011/0183833 A1 | 7/2011 | Calado Da Silva et al. |
| 2011/0200863 A1 | 8/2011 | Xiao et al. |
| 2011/0269010 A1 | 11/2011 | Sawaguchi et al. |
| 2011/0293990 A1 | 12/2011 | Ryu et al. |
| 2012/0308872 A1 | 12/2012 | Huang |

FOREIGN PATENT DOCUMENTS

| | | |
|---|---|---|
| JP | 2004-158453 A | 6/2004 |
| JP | 2005-196999 A | 7/2005 |
| JP | 2001-307708 A | 6/2007 |
| JP | 2007-149648 A | 6/2007 |
| JP | 2011-113915 A | 6/2011 |

OTHER PUBLICATIONS

Korean Intellectual Property Office, Preliminary Rejection issued in KR Patent Application No. 10-2015-7018432, dated May 1, 2020, pp. 1-6.

CERAMIC COATING ON BATTERY SEPARATORS

CROSS-REFERENCE TO RELATED APPLICATIONS

The present application is a Divisional of U.S. National Phase application Ser. No. 14/652,018, filed Jun. 12, 2015, which claims priority to PCT/US2013/074449, filed Dec. 11, 2013 which claims benefit of U.S. Prov. Appln. No. 61/736,968, filed Dec. 13, 2012. The contents of all the above mentioned applications are incorporated by reference herein in their entirety.

FIELD OF THE INVENTION

The present invention relates generally to electrochemical energy storage devices such as Li-ion batteries, and more particularly to a method of providing uniform ceramic coatings with controlled thicknesses for separators in such storage devices.

BACKGROUND OF THE INVENTION

The current generation of Li-ion batteries use porous polyolefin separators which are susceptible to thermal shrinkage at elevated temperatures and may cause short between positive and negative electrodes or the corresponding current collectors. A ceramic coating on the separator helps to inhibit direct contact, but current methods for forming the coating using printing techniques and the like are unable to uniformly coat four microns or less of ceramic particles on battery separators.

SUMMARY OF THE INVENTION

The present invention relates generally to electrochemical energy storage devices such as Li-ion batteries, and more particularly to a method of providing uniform ceramic coatings with controlled thicknesses for separators in such storage devices. Some embodiments of the invention utilize a layer by layer coating of nano/micro-sized particles dispersed in a solvent, which can be aqueous or non-aqueous. Other embodiments of the invention utilize a dry process such as PVD for depositing a ceramic film on a porous polyolefin separator. According to certain aspects of the invention, advantages of this approach include the ability to achieve a denser more uniform film with better controlled thickness with less waste and higher yield than current ceramic coating technology. An advantage of a ceramic coated separator is increased safety of cells.

In accordance with these and other aspects, a method according to embodiments of the invention includes preparing a separator for an electrochemical storage device; and using a controlled process to coat the separator with a ceramic layer having a desired thickness. In some embodiments, the controlled process comprises coating the separator with a first layer of ceramic particles having a first charge; coating the first layer with a second layer of ceramic particles having a second charge opposite the first charge; and repeating the coating steps until a ceramic coating having the desired thickness is obtained.

In other embodiments, the controlled process comprises preparing a source material comprising a ceramic material; and depositing the ceramic layer on the separator in a PVD chamber until the desired thickness is obtained.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
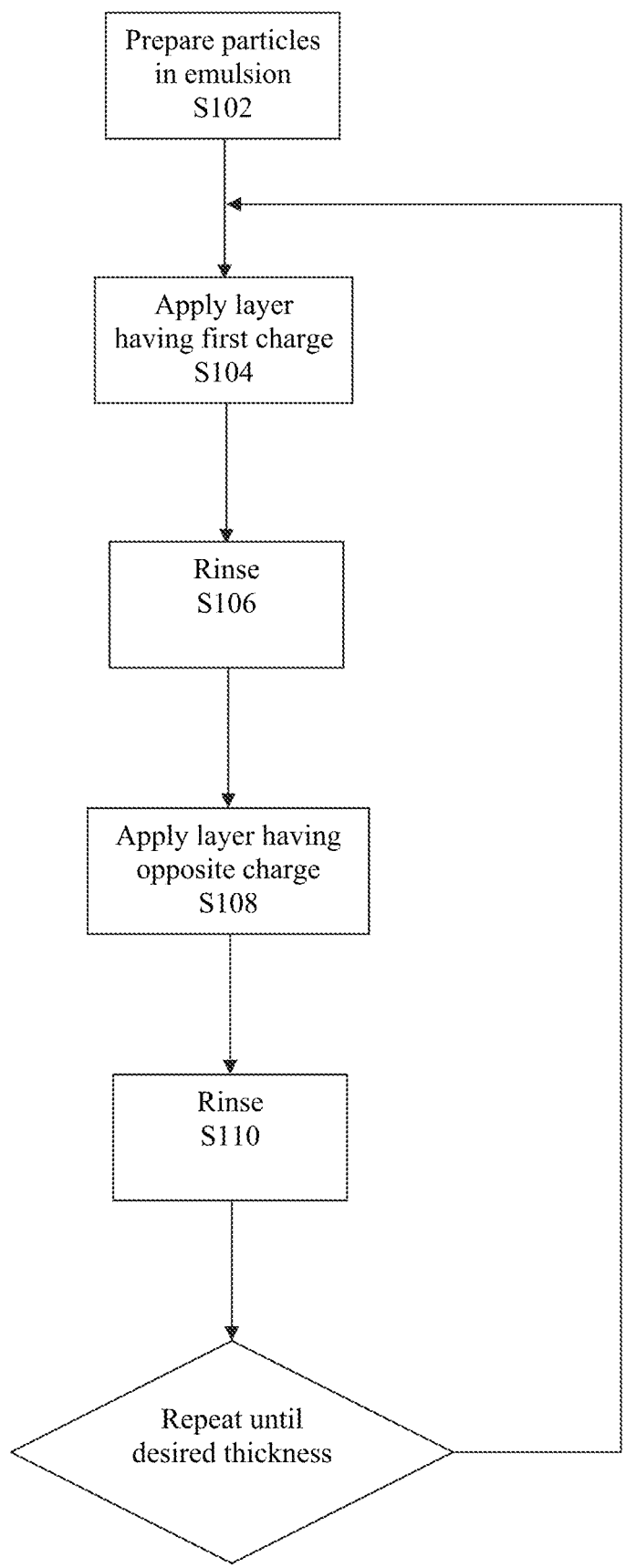
FIG. 1 is a flowchart illustrating an example process for fabricating a ceramic coated separator according to embodiments of the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present inventors recognize that it would be advantageous to have the ability to achieve a denser more uniform film with better controlled thickness with less waste and higher yield than current ceramic coating technology. An advantage of having a ceramic coated separator in an electrochemical storage device such as a battery includes increased safety of cells.

In some embodiments, the invention includes a layer by layer coating of oppositely charged nano/micro-sized particles from an aqueous medium could be very suitable to forming a ceramic coating on separators such as porous polyolefin separators. An example methodology according to these embodiments of the invention is shown in FIG. 1.

In a first step S102, two suspensions or emulsions of oppositely charged particles are prepared. The ceramic particles may be an insulating oxide such as $Al_2O_3$, $SiO_2$, etc., or an ion conducting ceramic such as $(Li,La)TiO_3$, Li—La—Zr—O, sulfide based electrolytes, etc. The particles are preferably nanometer sized, but can be micrometer sized. The particles may be dense or hollow. One example of commercially available ceramic particles that can be used in embodiments of the invention are $Al_2O_3$, $SiO_2$ and MgO.

A charge may be imparted to the particles either by controlling the composition or pH of the solution or by attaching a charger polyelectrolyte to the particle, by adsorption or reactive chemical bonding (grafting). Polyelectrolytes are polymers whose repeating units bear an -ionizable group. These groups will dissociate in certain solutions (e.g. water), making the polymers charged. Polyelectrolyte properties are thus similar to both electrolytes (salts) and polymers (high molecular weight compounds), and are sometimes called polysalts. Some of the industrially used polyelectrolytes are polydiallyldimethylammonium chloride, poly(allylamine)-Nafion/poly(acrylic acid), linear N,N-dodecyl,methyl-poly(ethyleneimine)/poly(acrylic acid), poly(ethyleneimine), poly(styrene sulfonate), poly(allylamine hydrochloride), poly(allylamine/poly(acrylic acid), poly (acrylic acid)/polyethylene oxide-block-polycaprolactone. Examples of negatively charged polyelectrolytes, when dissociated are poly(sodium styrene sulfonate) (PSS) and polyacrylic acid (PAA). Both PSS and PAA are negatively charged polyelectrolytes when dissociated. PSS is a 'strong' polyelectrolyte (fully charged in solution), whereas PAA is 'weak' (partially charged). Examples of positively charged polymers are Polyethylenimines, polylysene, Polyallylamine hydrochloride etc. Adsorption of polyelectrolytes on solid substrates is a surface phenomenon where long-chained polymer molecules with charged groups bind to a surface that is charged in the opposite polarity.

Although not shown as a separate step in FIG. 1, it may be necessary to prepare the separator if it is not inherently charged. In some embodiments, this preparation may include exposing the separator to a corona, chemically treating it (e.g. with an oxidizing agent), or adsorbing or grafting a polyelectrolyte to the surface of the separator. Having a charged separator is necessary for a first layer of oppositely charged particles to bind to the separator.

Step S104 includes applying a self-limiting layer consisting of one layer of particles. For example, if the separator is positively charged, then a negatively charged layer is applied. Once the surface is completely covered with the negatively charged layer, deposition of particles is ceased. It should be noted that the term "self-limiting" is used in this context to indicate that since a mono-layer of particles is deposited, there is no build-up of particles due to the natural repulsion between like charged particles. The application can be performed by coating the appropriate mixture onto the separator using a spray coating process, for example.

A rinsing process is performed in step S106 to rinse away any excess particles and solution. The rinsing may be performed by spraying water on the deposited layer or running the separator through a water bath. Alternatively, non-aqueous solvents such as acetonitrile, ethanol, N-Methyl-2-pyrrolidone, tetrahydrofuran etc. can be used. At this point, the separator is coated with one layer of ceramic particles having a thickness substantially corresponding to a diameter of the ceramic particles that have been used in the polymer solution.

In step S108 a second layer of particles of opposite charge to the previous layer is applied, and rinsing is performed in step S110. The application and rinsing can be performed in the same manner as in steps S104 and S106. At this point, the separator will have a ceramic coating with a thickness substantially about twice the diameter of the ceramic particles being used.

Steps S104 to S110 are repeated as many times as necessary to achieve the desired thickness of the ceramic coating.

Figure 2:
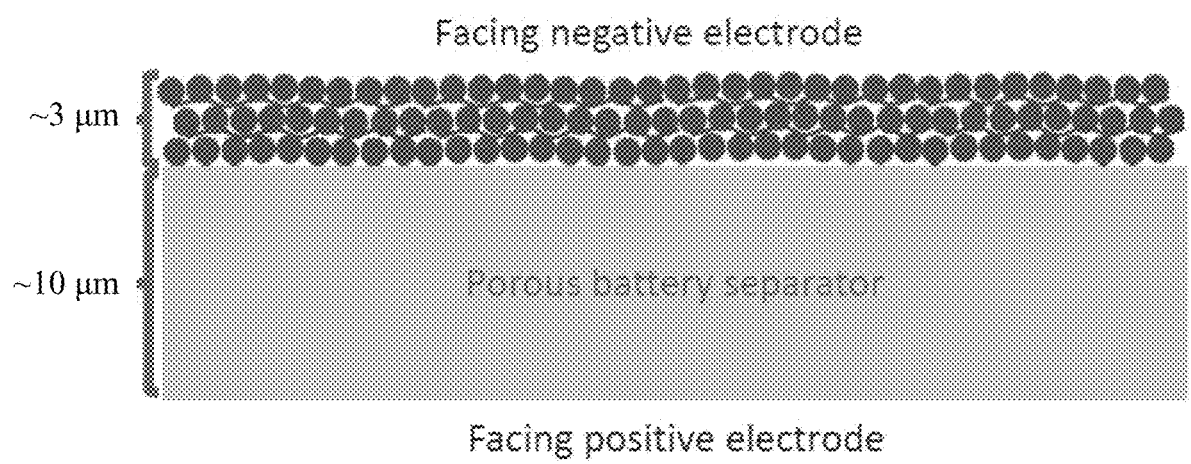
FIG. 2 illustrates an example completed structure of a ceramic coated separator according to embodiments of the invention.

FIG. 2 illustrates a completed separator structure with one surface coated. Embodiments of the invention use existing battery separators and modify them with a ceramic particle coating using a method as described above. In embodiments, the separator is typically an approximately 25 micron thick structure made of polyolefin. Commercially available separators that are suitable for use in the invention include, for example, polymeric porous separators produced by Polypore (Celgard), Toray Tonen (Battery separator film (BSF)), SK Energy (lithium ion battery separator (LiBS), Evonik industries (SEPARION), Asahi Kasei (Hipore), DuPont (Energain), etc.

In the example shown in FIG. 2, a coating of about 3 microns thick has been applied on a surface of the separator that faces a negative electrode in a battery structure. However, both sides of the separator can be coated in some embodiments. In such embodiments, the entire coated separator structure can be about 16 microns thick, and perhaps as thin as 10 microns thick.

The above described embodiment is successful in achieving a denser and more uniform separator coating with better controlled thickness with less waste and higher yield than current ceramic coating technology. However, the inventors have discovered that it is not always possible to reliably form films using micro particles in the above process, as it is sometimes difficult to cause them to adhere to the surface. Using nano particles instead overcomes this problem, but it requires extra cycles of layer applications to achieve the desired film thickness.

Figure 3:
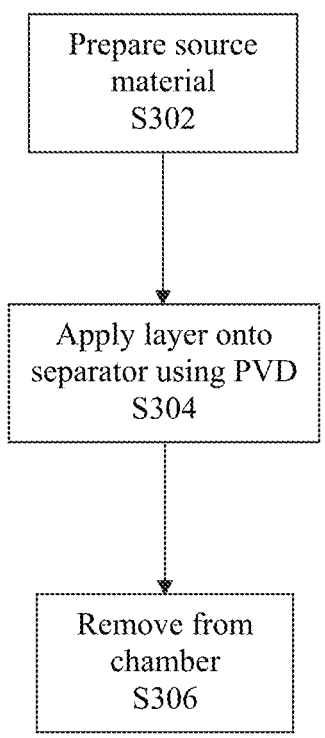
FIG. 3 is a flowchart illustrating another example process for fabricating a ceramic coated separator according to embodiments of the invention.

Accordingly, alternative embodiments of the invention involve dry methodologies for forming the ceramic coating rather than the wet process described above. One example dry process involves the use of physical vapor deposition (PVD) techniques and does not require the use of particles. FIG. 3 is a flowchart illustrating an example process according to these embodiments of the invention.

As shown in FIG. 3, processing starts with preparing the film source material in step S302. This can include $SiO_2$ or $Al_2O_3$ in a solvent and preferably aqueous solvent with surfactant molecules to properly disperse the particles.

In step S304, the separator structure is placed in a PVD chamber such as Endura Impulsive PVD or Aristo tools from Applied Materials of Santa Clara, Calif. The separator structure can include $SiO_2$, $Al_2O_3$, lithium conducting ceramic oxides such as doped variants of the garnet compositions, perovskites, anti-perovskites and lithium conducting sulfides, with a polymeric separator as substrate.

In step S306, processing continues until the desired thickness of material is deposited the coated separator is removed from the PVD chamber.

It should be noted that the steps S304 and S306 can be repeated for forming films on both sides of the separator structure.

The present inventors have noted certain advantages of the embodiment described above in connection with FIG. 3 over the previous embodiment. For example, the resulting coated structure has increased thermal stability and increased wettability. Moreover, the resulting coated structure has enhanced ion conductivity, which is believed to be caused by liquid-surface interaction between the $SiO_2$ or $Al_2O_3$ molecules into the pores of the separator material. This allows the entire separator structure to be reduced in thickness below 10 µm, with the film thicknesses on the order of nanometers.

Figure 4:
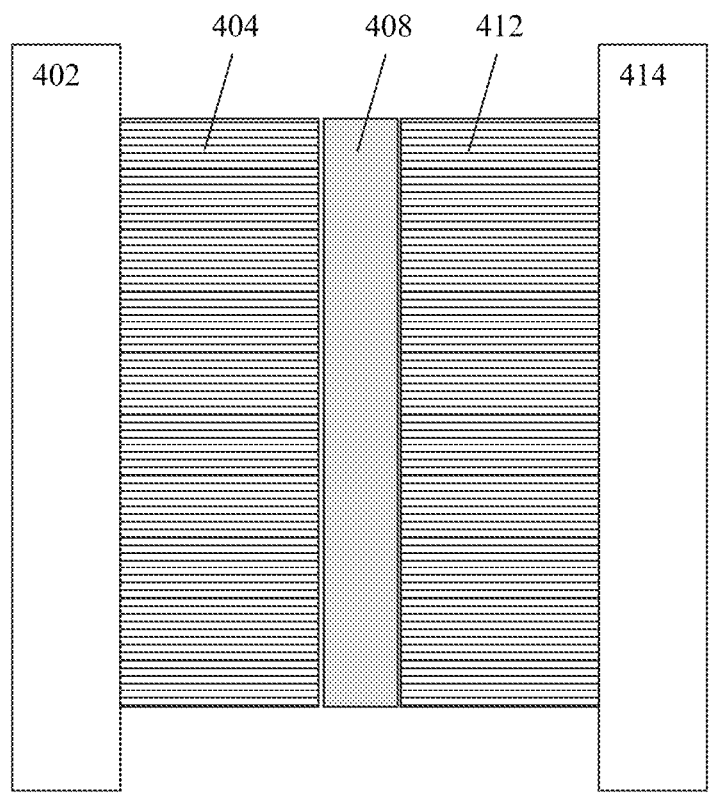
FIG. 4 illustrates an example Li Ion battery structure having a ceramic coated separator according to embodiments of the invention.

FIG. 4 illustrates an example Li Ion battery structure having a coated separator according to any of the above embodiments of the present invention. A cross-sectional representation of an example of a Li Ion cell 400 is shown in FIG. 4, with a current collector 402, anode coating 404, a coated separator 408, a cathode coating 412 and a current collector 414. All components except collectors 402 and 414 also contain lithium ion electrolytes.

In embodiments of a Lithium Ion cell according to the invention, Lithium is contained in atomic layers of crystal structures of carbon graphite ($LiC_6$) at the anode and lithium manganese oxide ($LiMnO_4$) or lithium cobalt oxide (LiCoO) at the cathode. The other layers shown in FIG. 4 are needed to conduct electrons and positively charged Lithium Ions. The layers may be either coiled inside each other in a cylinder or pressed together in rectangular flat layers.

Current collector 402 can be a copper plate, while current collector 414 can be an aluminum plate. Electrolytes infused in 404, 408 and 412 can be comprised of a liquid/gel or a solid polymer and may be different in each. Coated separator 408 can be a separator as described in any of the embodiments above.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A battery comprising:
    a negative electrode;
    a positive electrode; and
    a separator disposed between the negative electrode and the positive electrode, wherein the separator comprises:
        a porous battery separator material having a negative electrode facing surface and an opposite positive electrode facing surface, and
        a ceramic coating that is uniformly distributed on the negative electrode facing surface, wherein the separator includes multiple ceramic coating layers on the negative electrode facing surface in which successive ceramic coating layers are oppositely charged.

* * * * *